(12) United States Patent
Gregory et al.

(10) Patent No.: US 9,108,612 B2
(45) Date of Patent: Aug. 18, 2015

(54) HOVERCRAFT WITH MULTIPLE, INDEPENDENTLY-OPERABLE LIFT CHAMBERS

(71) Applicants: John Gregory, New Oxford, PA (US); Woodrow Wagaman, Hanover, PA (US)

(72) Inventors: John Gregory, New Oxford, PA (US); Woodrow Wagaman, Hanover, PA (US)

( * ) Notice: Subject to any disclaimer, the term of this patent is extended or adjusted under 35 U.S.C. 154(b) by 221 days.

(21) Appl. No.: 13/867,599

(22) Filed: Apr. 22, 2013

(65) Prior Publication Data

US 2014/0311813 A1  Oct. 23, 2014

(51) Int. Cl.
*B60V 1/00* (2006.01)
*B60V 1/04* (2006.01)
*B60V 1/11* (2006.01)
*B60V 1/18* (2006.01)
*B60V 1/22* (2006.01)

(52) U.S. Cl.
CPC . *B60V 1/043* (2013.01); *B60V 1/11* (2013.01); *B60V 1/18* (2013.01); *B60V 1/22* (2013.01)

(58) Field of Classification Search
CPC ....... A63H 27/02; A63H 27/12; A63H 27/14; A61G 5/061; A61G 5/068; B64C 39/028; B60V 1/16; B60V 1/06; B60V 1/115; B60V 1/00
USPC .......................................... 180/116, 117, 121
See application file for complete search history.

(56) References Cited

U.S. PATENT DOCUMENTS

| | | | | |
|---|---|---|---|---|
| 3,182,739 | A | * | 5/1965 | Cockerell ..................... 180/118 |
| 3,207,245 | A | * | 9/1965 | Weiland ....................... 180/119 |
| 3,263,764 | A | * | 8/1966 | Bertin ........................... 180/121 |
| 3,302,602 | A | * | 2/1967 | Korganoff ..................... 114/313 |
| 4,718,501 | A | | 1/1988 | Lawler |
| 4,984,754 | A | | 1/1991 | Yarrington |
| 5,105,898 | A | | 4/1992 | Bixel, Jr. |
| 5,195,039 | A | * | 3/1993 | Gold et al. ......................... 701/7 |
| 5,377,775 | A | | 1/1995 | Rush |
| 5,522,470 | A | | 6/1996 | Stiegler |
| 5,560,443 | A | | 10/1996 | DuBose |
| 5,592,894 | A | | 1/1997 | Johnson |
| 6,200,069 | B1 | | 3/2001 | Miller |
| 6,260,796 | B1 | | 7/2001 | Klingensmith |
| 6,619,220 | B1 | | 9/2003 | Ducote |
| D543,928 | S | | 6/2007 | Sanders, Jr. |
| D564,046 | S | | 3/2008 | Hetman |
| 7,748,486 | B2 | | 7/2010 | Mantych |
| 7,931,239 | B2 | | 4/2011 | Pedersen |
| D646,198 | S | | 10/2011 | Desberg |
| 2002/0112908 | A1 | * | 8/2002 | Wilk .............................. 180/116 |
| 2004/0094662 | A1 | | 5/2004 | Sanders, Jr. |
| 2005/0194196 | A1 | * | 9/2005 | Lee et al. ...................... 180/117 |

FOREIGN PATENT DOCUMENTS

GB    1296044 A  * 11/1972

* cited by examiner

*Primary Examiner* — Kevin Hurley
(74) *Attorney, Agent, or Firm* — Galbreath Law Offices, P.C.; John A. Galbreath

(57) ABSTRACT

The invention is a hovercraft with multiple lift chambers which are operable independently of each other. Independently-operable pivot arm assemblies connect each lift chamber to the hovercraft main body, and his gives the hovercraft the ability to travel over uneven surfaces, traverse obstacles that would block conventional hovercrafts, and climb or descend even severe inclines. The hovercraft also includes side thrusters which allow it to maintain its vertical position on an incline while traveling laterally across the incline.

19 Claims, 18 Drawing Sheets

HOVERCRAFT WITH MULTIPLE, INDEPENDENTLY-OPERABLE LIFT CHAMBERS

CROSS-REFERENCES TO RELATED APPLICATIONS

Not Applicable.

BACKGROUND

1. Field of the Invention

The invention is in the area of hovercrafts.

2. Description of the Related Art

The prior art discloses various hovercrafts; however, none of these prior art devices exhibit the features of the present invention—that is, multiple, independently-operable lift chambers which enable the inventive hovercraft to surmount and overcome obstacles that block conventional hovercrafts.

U.S. Pat. No. 7,931,239 to Pedersen discloses a hovercraft with two pairs of counter-rotating fans to generate lift. However, Pedersen's device has only a single lift chamber—not multiple, independently-operable lift chambers as in the invention.

U.S. Pat. No. 7,748,486 to Mantych discloses a landing gear for a hovercraft. Self-leveling legs are used to accommodate landing the hovercraft on a sloped surface. However, the legs do not allow the lift chamber to be raised or lowered with respect to the hovercraft main body, as in the invention, nor does Mantych disclose multiple, independently-operable lift chambers.

U.S. Design Pat. No. D564,046 to Hetman shows two air cushions for a toy hovercraft—but there is no disclosure that the toy actually operates—that is, blows air through the cushions to generate lift. And in any case, Hetman's air cushions are not movable, much less movable independently of each other as in the invention.

U.S. Design Pat. No. D543,928 to Sanders, Jr. shows a hovercraft with a stacked rotor thruster and winglets. The Sanders, Jr. device does not show multiple, independently-operable lift chambers, as in the invention.

U.S. Pat. No. 5,592,894 to Johnson discloses a "spidercraft" with four large tires and ground effect wings for planing over rough seas or rolling over rough terrain. However, it is definitely not a hovercraft, and uses significantly different technology than a hovercraft. There are no multiple, independently-operable lift chambers, as in the invention. Moreover, in his specification Johnson discusses hovercraft only in the context of pointing out their disadvantages—disadvantages that Johnson contends his spidercraft device overcomes.

U.S. Pat. No. 5,522,470 to Stiegler discloses a hovercraft with two engines to drive forward movement and a trim compensator to direct the driving air jets and steer the hovercraft. However, there is only one fan to generate lift, and only one lift chamber—not multiple, independently-operable lift chambers as in the invention.

U.S. Pat. No. 5,560,443 to DuBose discloses a hovercraft with a segmented skirt to reduce plowing. DuBose's device has only a single lift chamber, which is very different from the invention's multiple, independently-operable lift chambers.

U.S. Pat. No. 5,377,775 to Rush discloses a combination hovercraft-motorcycle with wheels in front of and in back of the hovercraft section. However, in Rush's device the wheels are continuously operated, and cannot be raised and lowered to go in and out of service as in the invention. Also, Rush's hovercraft section has only a single lift chamber—not multiple, independently-operable lift chambers.

U.S. Published Appl. No. 2004/0094662 by Sanders, Jr. discloses a hovercraft with the capability of taking off and landing vertically (VTOL). Sanders Jr.'s device has only a single lift chamber—not multiple, independently-operable lift chambers as in the invention.

U.S. Pat. No. 6,619,220 to Ducote discloses a hybrid SES (surface effect ship)/hovercraft having a retractable flexible skirt, so that the device can operate as a high speed SES on open water and as a hovercraft on land. Ducote's device has only a single lift chamber, which is very different from the invention's multiple, independently-operable lift chambers.

U.S. Design Pat. No. D646,198 to Desberg shows a hovercraft with a single thruster to propel the craft forward, and steering vanes to control the direction of the thrust. The Desberg device does not show multiple, independently-operable lift chambers, as in the invention.

U.S. Pat. No. 6,260,796 to Klingensmith discloses a multi-thrustered hovercraft—but it does not disclose or suggest not multiple, independently-operable lift chambers as in the invention. Instead, Klingensmith's multiple thrusters are just used for controlling the movement and direction of the hovercraft more effectively.

U.S. Pat. No. 6,200,069 to Miller discloses a hovercraft that converts into a fixed work platform when it is in a desired position over water. As with the other devices discussed above, Miller's device has only a single lift chamber—not multiple, independently-operable lift chambers as in the invention.

U.S. Pat. No. 4,984,754 to Yarrington discloses a hovercraft with a heli-rotor at its uppermost point for propelling the craft. However, Yarrington's device has only a single lift chamber—not multiple, independently-operable lift chambers as in the invention.

U.S. Pat. No. 5,105,898 to Bixel, Jr. discloses a hovercraft ground effect vehicle that is capable of sustained flight. Bixel Jr.'s device is not really a hovercraft but instead operates on ground effect principles. It does not have a lift chamber—much less multiple, independently-operable lift chambers as in the invention.

U.S. Pat. No. 4,718,501 to Lawler discloses a self-trailering hovercraft with wheels that can be lowered to the ground. However, Lawler's device has only a single lift chamber, which is very different from the invention's multiple, independently-operable lift chambers.

In sum, none of the prior art hovercrafts disclose or suggest the unique features and capabilities seen in the invention.

SUMMARY OF THE INVENTION

The invention is a hovercraft with multiple lift chambers which are operable independently of each other. This gives the inventive hovercraft the ability to travel over uneven surfaces, traverse obstacles that would block conventional hovercrafts, and climb or descend even severe inclines.

When the hovercraft approaches an obstacle—for example, a vertically-faced ridge or abutment—the forward chamber can be independently raised by hydraulic, motor, compressed, air, manual, or other suitable means, until it clears the obstacle. The other chambers, meanwhile, hover over the lower ground surface—i.e., the ground surface before the obstacle. The hovercraft is then moved forward until the second chamber encounters the obstacle. The second chamber is raised until it clears the obstacle; the hovercraft is moved further forward; and so on until the hovercraft has progressively "stepped" over the obstacle.

The inventive hovercraft can also travel across an incline laterally without losing its vertical position (i.e., its "height")

on the incline. The hovercraft's unique ability of being able to maintain its vertical position while traveling laterally on an incline is due to its two side thrusters, one located at the bow and the other at the stern of the craft. The side thrusters can swivel, so that their thrust offsets the force of gravity acting on the hovercraft which would otherwise cause the craft to fall down the incline as it travels laterally across it. The side thrusters can also be tilted downward to create additional lift off the ground surface for the craft, when desired.

The inventive hovercraft is propelled forward by two other main thrusters. These main thrusters can be turned through a 360 degree range. If the main thrusters are turned 180 degrees, this allows the craft to go backwards. The main thrusters can also be turned 90 degrees, i.e., so their thrust is directed downward, to create additional lift off the ground surface if desired. Each thruster can tilt/swivel independently of each other, thus allowing the craft to perform very tight maneuvers when required.

In addition, the forward lift chamber and the rear lift chamber house wheels that are retractable. On a solid, relatively even surface such as a road, the retractable wheels can be lowered to the ground and the craft driven as a road vehicle. The forward and rear chambers may also house retractable hydrofoils that are retractable, so that on a relatively even water surface, the retractable hydrofoils can be lowered to the water and the craft driven as a hydrofoil. This saves fuel and extends the range of the hovercraft.

The inventive hovercraft is thus completely versatile over all terrains—even those that include significant inclines or declines, as well as obstacles.

DETAILED DESCRIPTION OF THE INVENTION

Figure 1:
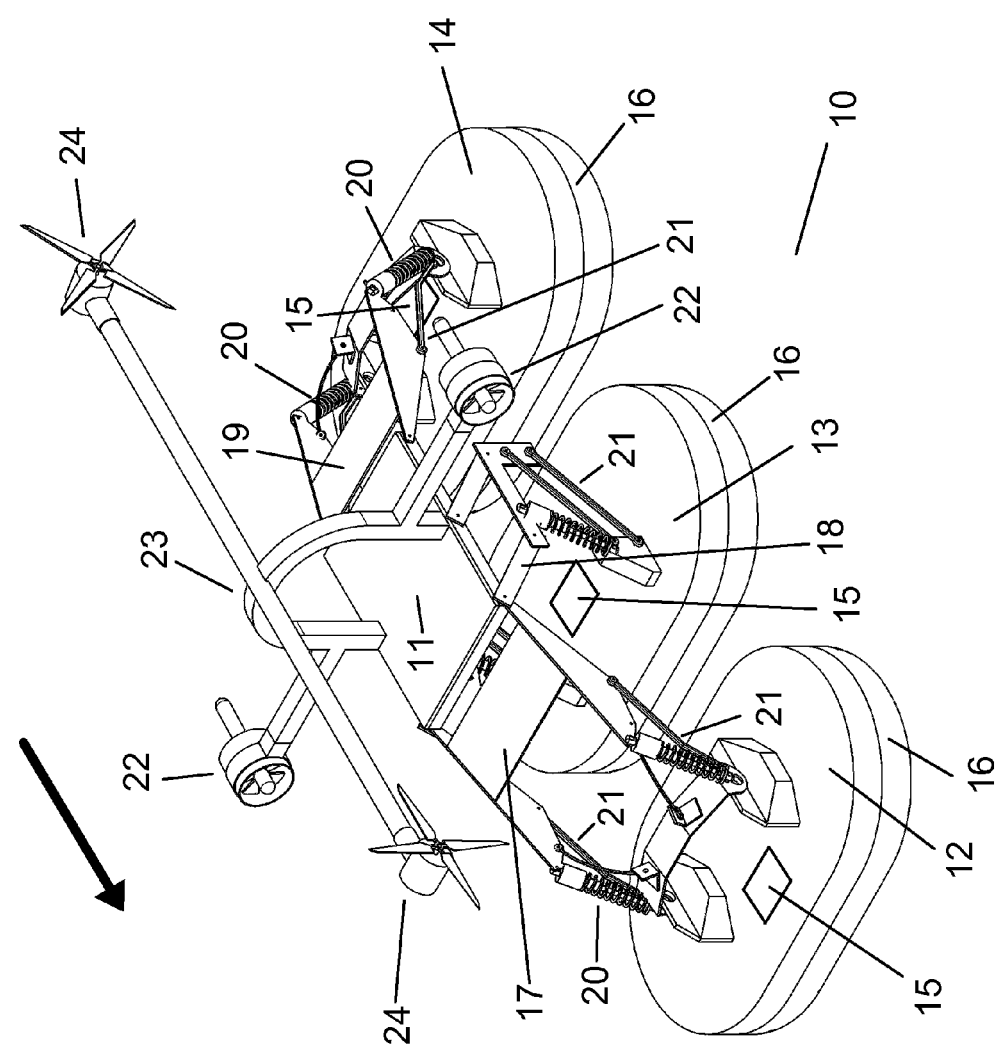
FIG. 1 is a perspective view illustrating the main components of the hovercraft.

The following provides a list of the reference characters used in the drawings:
- 10. Hovercraft
- 11. Main body
- 12. First lift chamber
- 13. Second lift chamber
- 14. Third lift chamber
- 15. Blower
- 16. Flexible skirt
- 17. First pivot arm assembly
- 18. Second pivot arm assembly
- 19. Third pivot arm assembly
- 20. Spring
- 21. Linkage
- 22. Main thrusters
- 23. Frame
- 24. Side thrusters
- 25. Air duct
- 26. Wheel assembly
- 27. Wheel extension/retraction motor
- 28. Stanchion
- 29. Pivot arm motor
- 30. Threaded rod
- 31. Threaded fitting
- 32. Obstacle
- 33. Incline
- 34. Central processor
- 35. First accelerometer
- 36. Second accelerometer
- 37. Third accelerometer
- 38. First gyroscope
- 39. Second gyroscope
- 40. Third gyroscope
- 41. GPS
- 42. Control module
- 43. Power source
- 44. Software
- 45. Hydrofoil assembly
- 46. Hydrofoil extension/retraction motor FIG. 1 is a perspective view illustrating the main components of the invention. The hovercraft 10 has a main body 11, to which first lift chamber 12, second lift chamber 13, and third lift chamber 14 are attached. Each lift chamber has a blower 15 located thereon, and blower 15 uses blades turned by a motor to blow air down into the bottom of the lift chamber in order to generate lift. Blower 15 is shown as a "black box", as it is a conventional blower seen in hovercrafts. Each lift chamber also has a flexible skirt 16 around the lower circumference thereof, in order to help seal the bottom of the lift chamber against the ground or other operating surface, and thus help seal in the air blown down into the bottom of the lift chamber by blower 15.

First lift chamber 12, second lift chamber 13, and third lift chamber 14 are attached to main body 11 by first pivot arm assembly 17, second pivot arm assembly 18, and third pivot arm assembly 19 respectively. Each pivot arm assembly is rotatably attached to main body 11, such that it can pivot up or down thus raising or lowering its attached lift chamber. Springs 18 are connected between the pivot arm assemblies and lift chambers, which allows the lift chambers to move up and down when encountering unevenness in the ground or other operating surface while the spring keeps tension against the surface. Linkages 21 also connect the pivot arm assemblies to the lift chambers, serving to further control and stabilize lift chamber movement. Springs 20 and linkages 21 are provided with swivel end fittings, so that first lift chamber 12, second lift chamber 13, and third lift chamber 14 are still able to swivel when uneven operating surface conditions are encountered. That is, the lift chambers can rotate so that their back end is higher or lower than their front end, and/or one side is higher or lower than the other side, in a manner similar to the movement indicated by the illustrative arrows in FIG. 6.

Main thrusters 22 are attached to main body 11 by a frame 23. The main thrusters operate via motor-driven blades, and provide forward movement for hovercraft 10. Main thrusters 22 are rotatable on their mountings, to provide thrust in other directions including pointed up to provide additional lift, or pointing down if desired. Main thrusters 22 can also be rotated 180 degrees, in order to provide reverse thrust and move hovercraft 10 backward. Said another way, although the main thrusters in this view are pointed to provide forward movement as indicated by the illustrative arrow, they can be rotated 180 degrees to provide backward movement, in the direction opposite from the arrow.

Side thrusters 24 are also attached to main body 11 by frame 23. The side thrusters have motor-driven blades which provide thrust to counter the force of gravity when hovercraft 10 is traveling laterally across an inclined surface, and maintain the vertical position of hovercraft 10 on the inclined surface. Side thrusters 24 are rotatable on their mountings, so that they can provide thrust in the opposite sideways direction when pointed in that direction, and can provide additional upward thrust/lift when pointed downward. Side thrusters 24 also incorporate variable-pitch blades, and thus the blade pitch can be reversed to provide thrust in the opposite sideways direction without having to rotate the side thruster on its mounting. Side thrusters 24 are located along the front-to-rear centerline of hovercraft 10, in order to minimize the torque steer impact on forward and reverse hovercraft movement when the side thrusters are operating.

Figure 2:
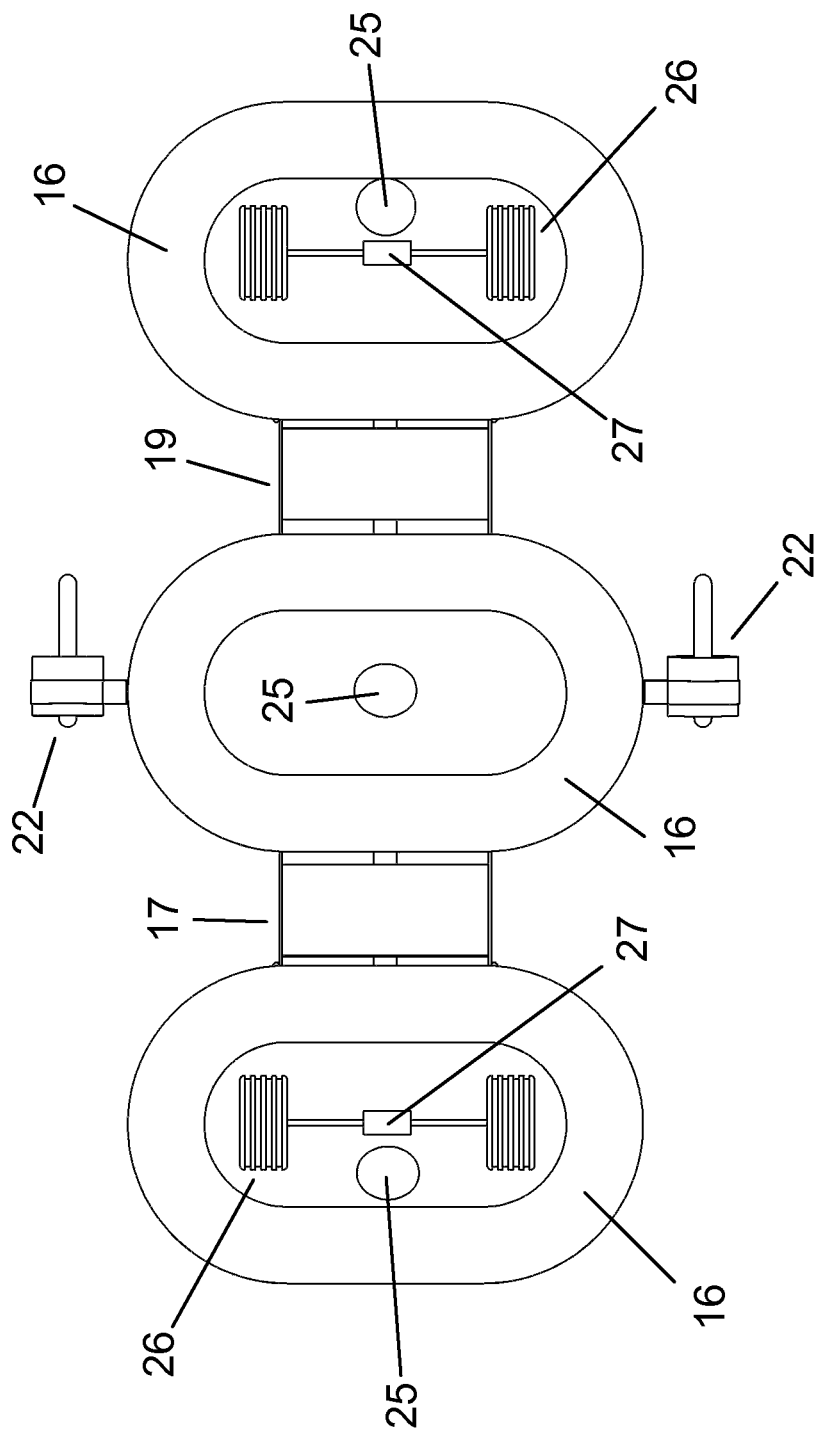
FIG. 2 is a bottom view of the hovercraft, showing the interior of the lift chambers and the wheel assemblies.

FIG. 2 is a bottom view of the hovercraft, showing the interior of the lift chambers and the wheel assemblies. Flexible skirts 16 extend around the bottom of the lift chambers, and each lift chamber contains an air duct 25 which conducts air from blower 15 into the interior of the lift chamber. Wheel assemblies 26, each comprising two wheels and an axle therebetween, are located in the interior of first lift chamber 12 and third lift chamber 14. Via wheel extension/retraction motors 27 or hydraulic, manual, or other suitable means, wheel assemblies 26 can be lowered to the ground or other operating surface when such surface is suitably smooth, to enable the hovercraft to ride on wheels instead of a cushion of air. Wheel assemblies 26 are retracted when not in use, also via wheel extension/retraction motors 27 or hydraulic, manual, or other suitable means. The wheels in wheel assemblies 26 are steerable, to enable the hovercraft to change direction when riding on wheels instead of air. The hovercraft may also of course be "steered" in wheels-extended mode by varying the thrust of one main thruster 22 versus the other main thruster 22.

Figure 3:
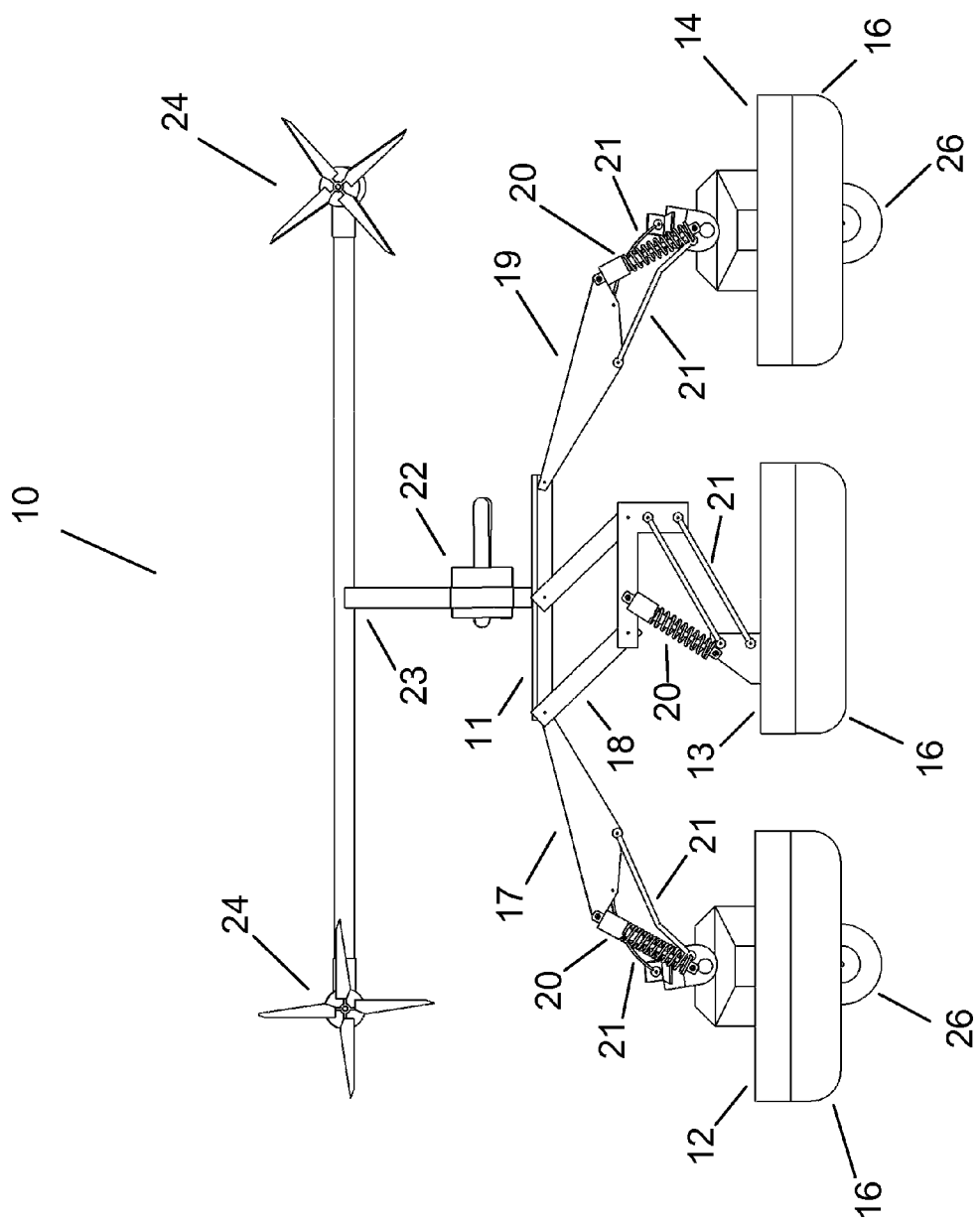
FIG. 3 is a side view of the hovercraft, with the wheels in the extended/down position.

FIG. 3 is a side view of the hovercraft. In this view, wheel assemblies 26 are in the extended/down position.

Figure 4:
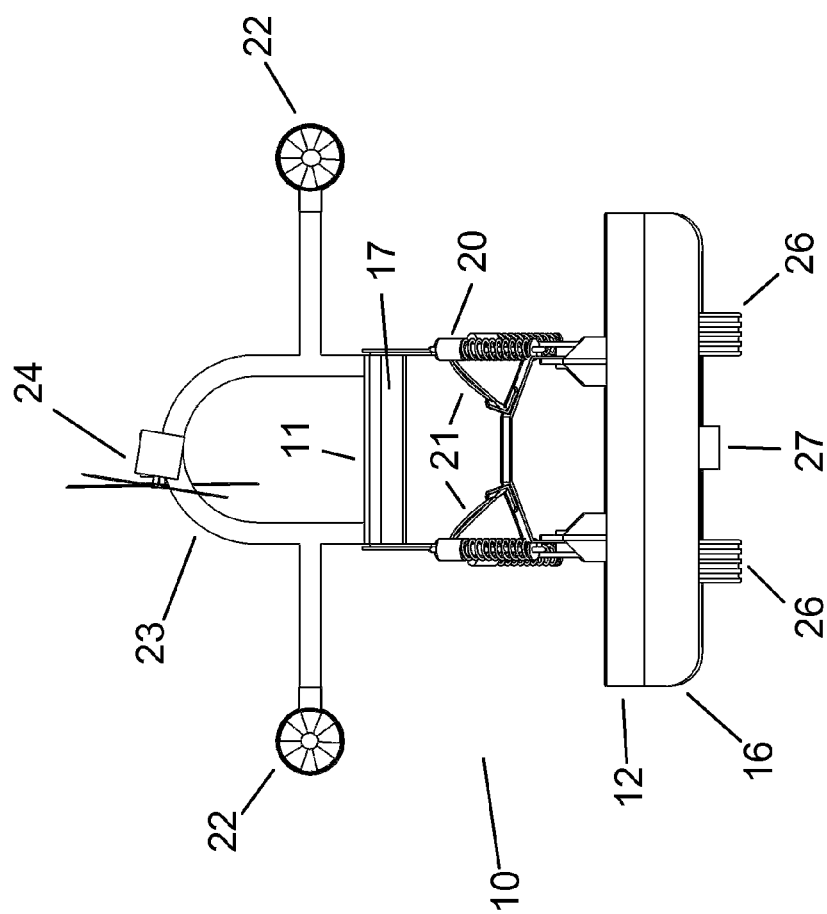
FIG. 4 is a front view of the hovercraft, corresponding to the wheels-down position shown in FIG. 3.
Figure 5:
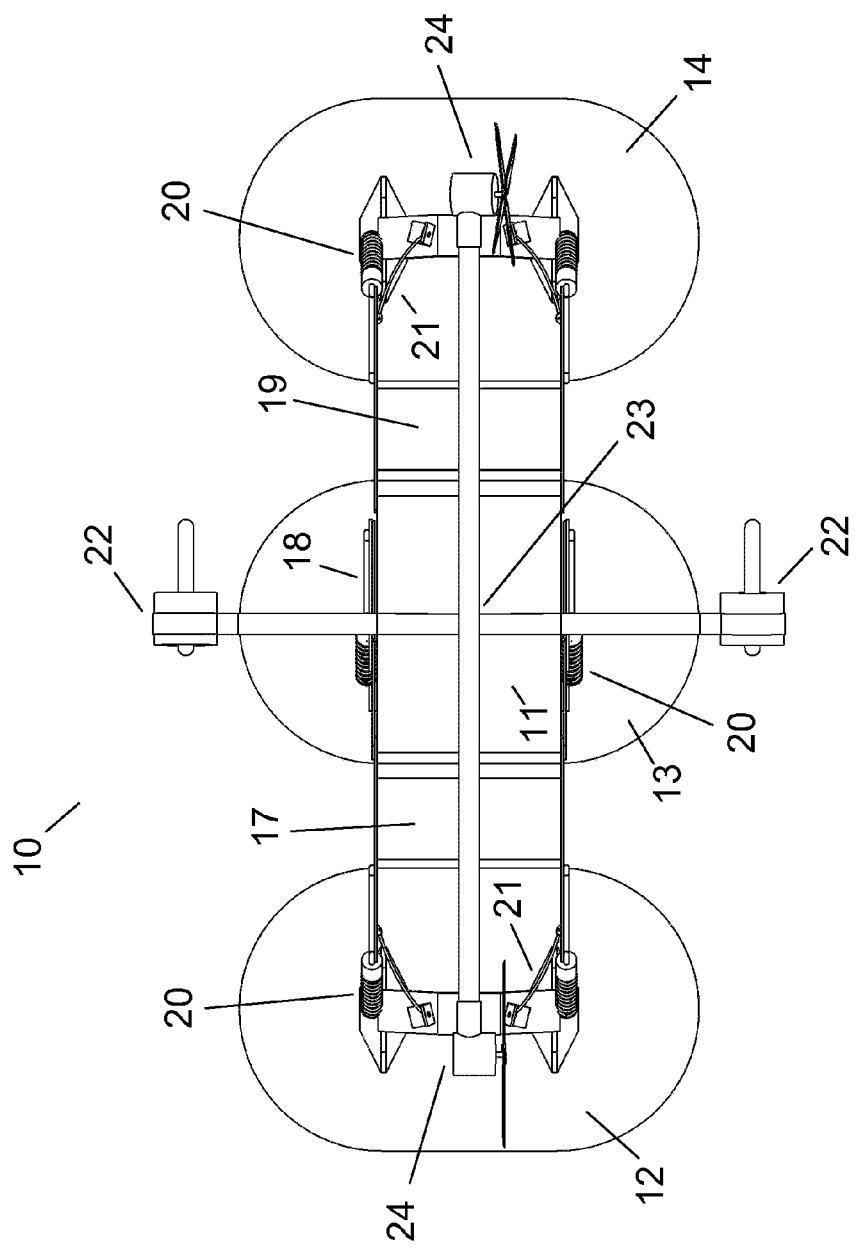
FIG. 5 is a top view of the hovercraft.

FIG. 4 is a front view of the hovercraft, also with wheel assemblies 26 in the extended/down position. Note that in FIG. 4, side thruster 24 has been rotated 180 degrees, so it is pointed in the opposite direction from that shown in FIGS. 1 and 3. FIG. 5 is a top view of the hovercraft.

Figure 6:
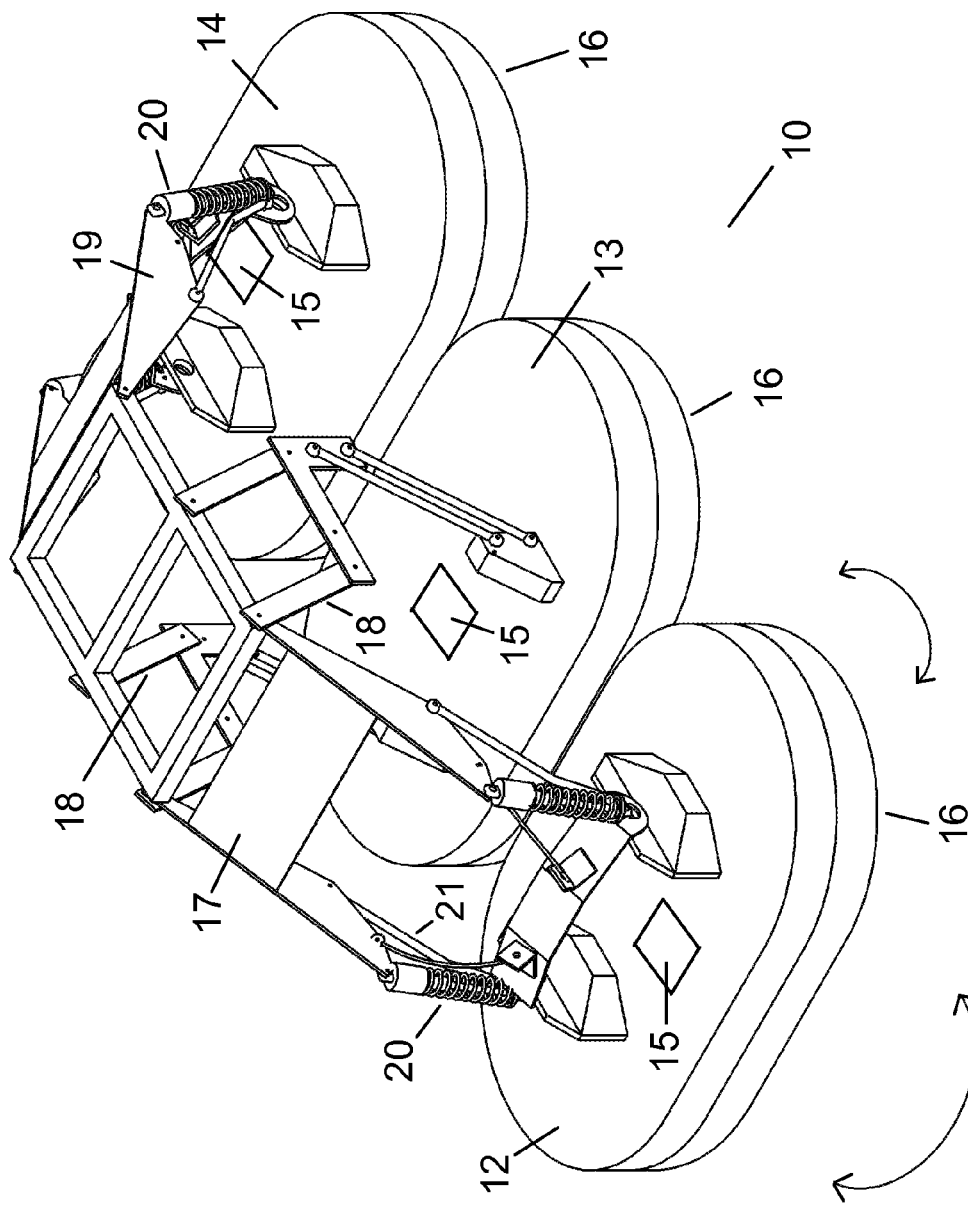
FIG. 6 is another perspective view of the hovercraft, with the main body, main and side thrusters, and frame omitted.

FIG. 6 is another perspective view of the hovercraft, with main body 11, main thrusters 22, side thrusters 24, and frame 23 omitted in order to show the structure of pivot assemblies 17, 18, and 19 more clearly. In the embodiment shown in this view, there are no springs on second lift chamber 13. As discussed above, each lift chamber can rotate so that its back end is higher or lower than its front end, and/or one side is higher or lower than the other side—as indicated by the illustrative arrows next to first lift chamber 12.

Figure 7:
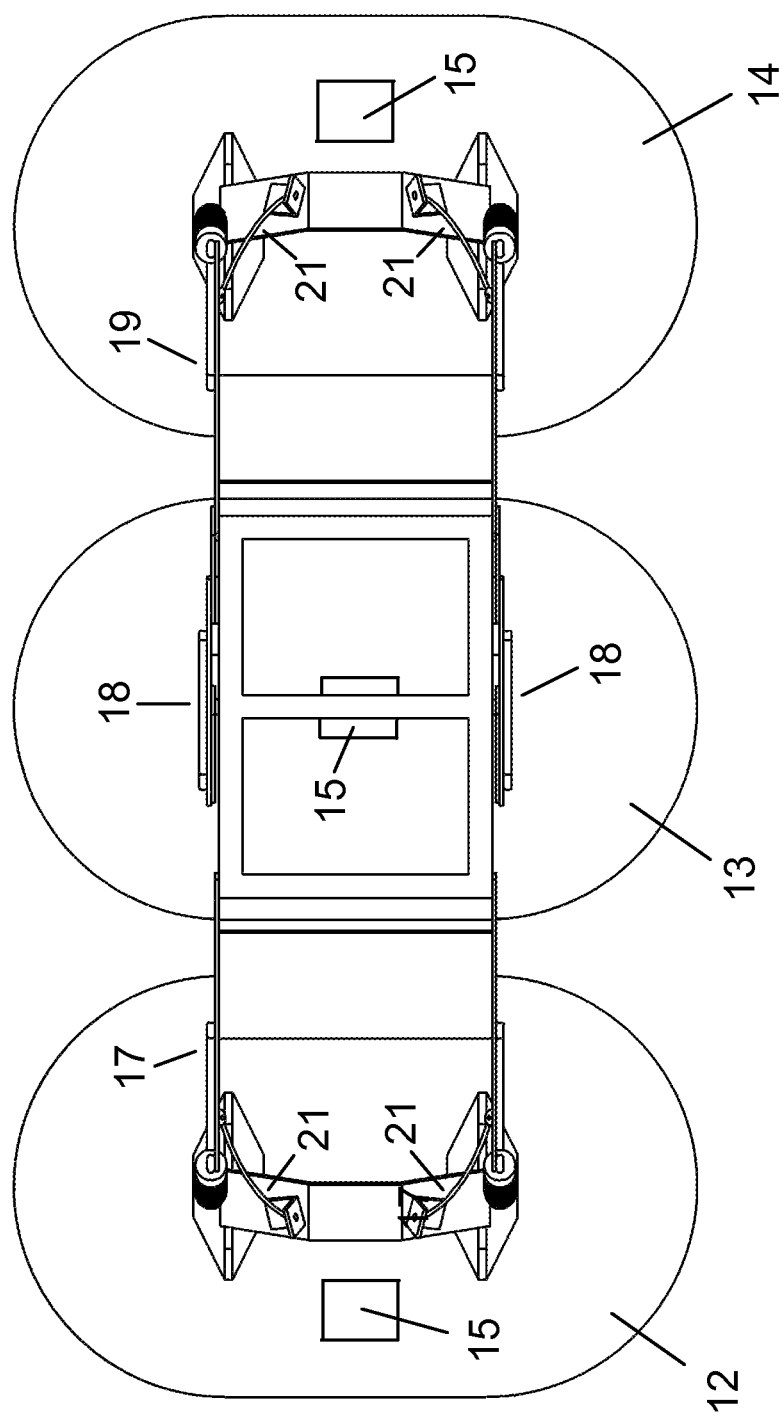
FIG. 7 is a top view of the embodiment shown in FIG. 5.

FIG. 7 is a top view of the embodiment shown in FIG. 6, showing the three lift chambers, pivot assemblies, and linkages.

Figure 8:
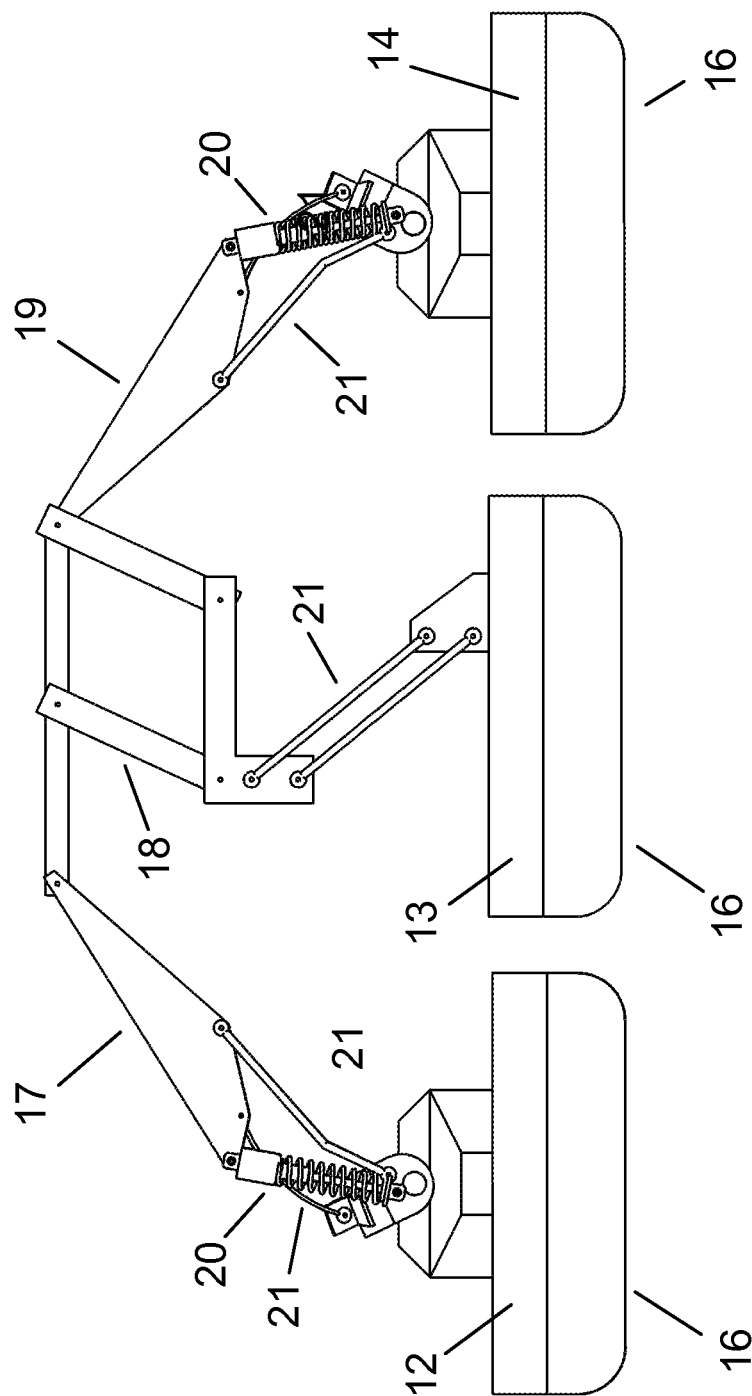
FIG. 8 is a side view of the embodiment shown in FIG. 5.

FIG. 8 is a side view of the embodiment shown in FIG. 6, with the wheels in the retracted/up position.

Figure 9:
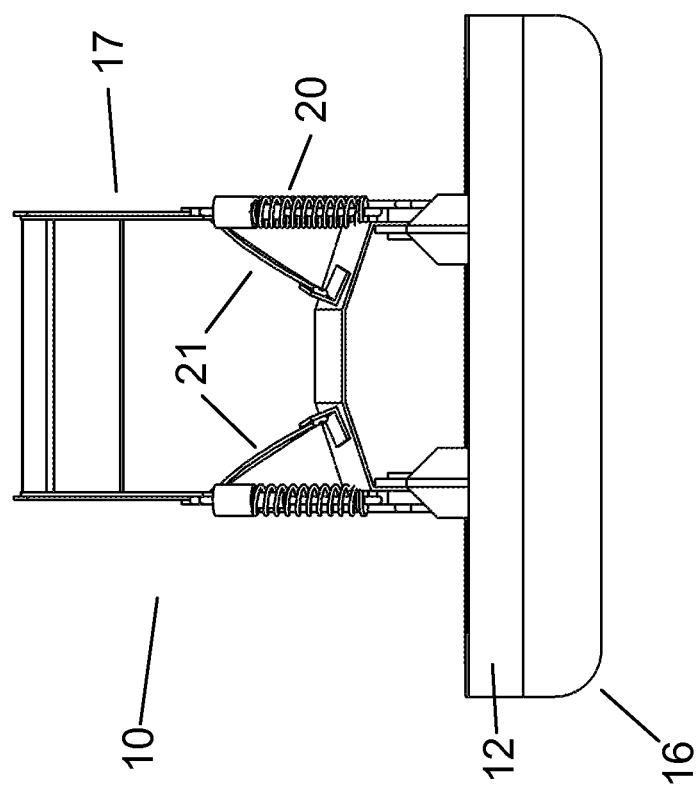
FIG. 9 is a front view of the embodiment shown in FIG. 5.

FIG. 9 is a front view of the embodiment shown in FIG. 6, also with the wheels in the retracted/up position.

Figure 10:
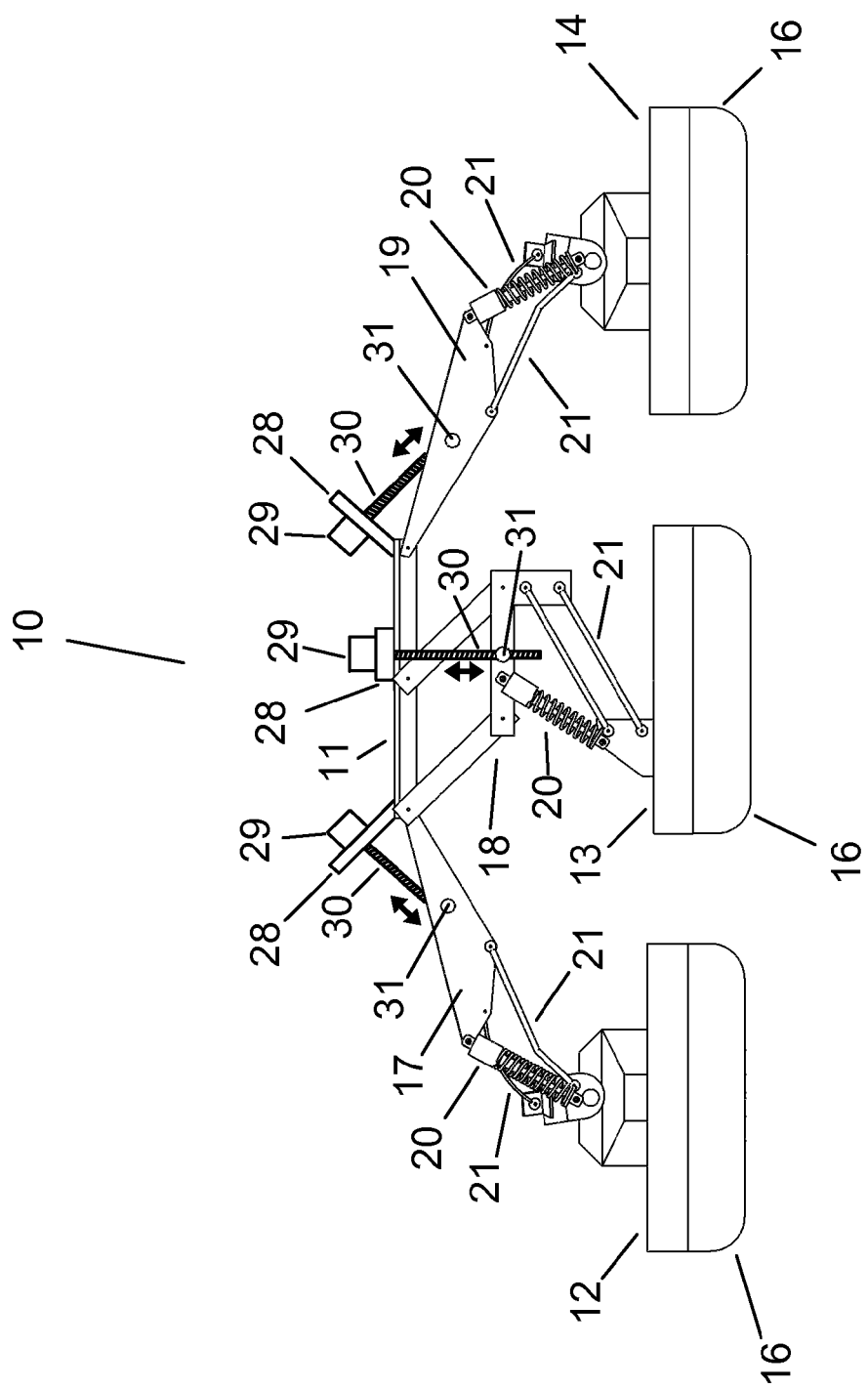
FIG. 10 is a side view of the hovercraft, illustrating the mechanisms which raise and lower the pivot arm assemblies and lift chambers.

FIG. 10 is a side view of the hovercraft, illustrating in particular the mechanisms which raise and lower the pivot arm assemblies and thus the lift chambers. In this view, the main thrusters 22, side thrusters 24, and frame 23 have been omitted, in order to show the raising/lowering mechanisms more clearly. Also, in this view the wheels are in the retracted/up position.

A stanchion 28 extends upward and outward from the forward edge of main body 11. A pivot arm motor 29 is located on stanchion 28. Threaded rod 30 is fixed at its upper end to the output shaft of pivot arm motor 29, passes through an opening in the bottom of stanchion 28, and then threads into and through a correspondingly threaded fitting 31 attached to first pivot arm assembly 17. When pivot arm motor 29 turns threaded rod 30 in one direction, threaded fitting 31 moves upward on threaded rod 30, thereby moving first pivot arm assembly 17 upward toward stanchion 28. Conversely, when pivot arm motor 29 turns threaded rod 30 in the other direction, threaded fitting 31 moves downward on threaded rod 30, thereby moving first pivot arm assembly 17 downward away from stanchion 28. The upward and downward movement of threaded fitting 31, and thus first pivot arm assembly 17, is indicated by the arrow. Threaded fitting 31 is rotatably attached to first pivot arm assembly 17, which prevents threaded fitting 31 from binding on threaded rod 30 as it and first pivot arm assembly 17 move upward and downward—i.e., toward and away from stanchion 28.

Similarly, another stanchion 28 extends outward from the side edge of main body 11. A pivot arm motor 29 is located on stanchion 28. Threaded rod 30 is fixed at its upper end to the output shaft of pivot arm motor 29, passes through an opening in the bottom of stanchion 28, and then threads into and through a correspondingly threaded fitting 31 attached to second pivot arm assembly 18. When pivot arm motor 29 turns threaded rod 30 in one direction, threaded fitting 31 moves upward on threaded rod 30, thereby moving second pivot arm assembly 18 upward toward stanchion 28. Conversely, when pivot arm motor 29 turns threaded rod 30 in the other direction, threaded fitting 31 moves downward on threaded rod 30, thereby moving second pivot arm assembly 18 downward away from stanchion 28. The upward and downward movement of threaded fitting 31, and thus second pivot arm assembly 18, is indicated by the arrow. Threaded fitting 31 is rotatably attached to second pivot arm assembly 18, which prevents threaded fitting 31 from binding on threaded rod 30 as it and second pivot arm assembly 18 move upward and downward—i.e., toward and away from stanchion 28.

Similarly, another stanchion 28 extends upward and outward from the back edge of main body 11. A pivot arm motor 29 is located on stanchion 28. Threaded rod 30 is fixed at its upper end to the output shaft of pivot arm motor 29, passes through an opening in the bottom of stanchion 28, and then threads into and through a correspondingly threaded fitting 31 attached to third pivot arm assembly 19. When pivot arm motor 29 turns threaded rod 30 in one direction, threaded fitting 31 moves upward on threaded rod 30, thereby moving third pivot arm assembly 19 upward toward stanchion 28. Conversely, when pivot arm motor 29 turns threaded rod 30 in the other direction, threaded fitting 31 moves downward on threaded rod 30, thereby moving third pivot arm assembly 19 downward away from stanchion 28. The upward and downward movement of threaded fitting 31, and thus third pivot arm assembly 19, is indicated by the arrow. Threaded fitting 31 is rotatably attached to third pivot arm assembly 19, which prevents threaded fitting 31 from binding on threaded rod 30 as it and third pivot arm assembly 19 move upward and downward—i.e., toward and away from stanchion 28.

Figure 11:
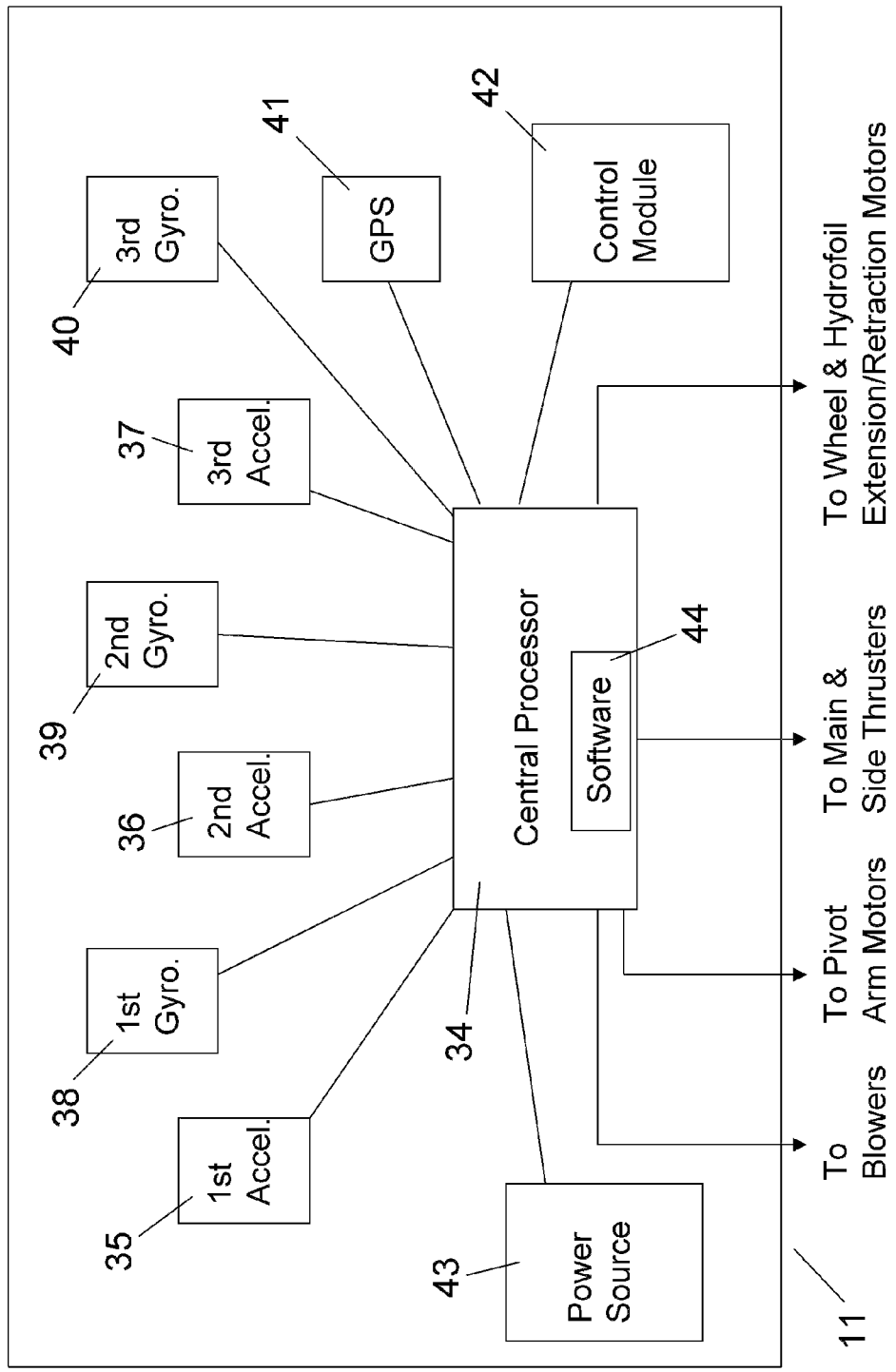
FIG. 11 illustrates the components that control the movements of the hovercraft.

As shown in FIG. 11, main body 11 contains the components that power and control the movements of the hovercraft. A central processor 34, which can be a microprocessor or other computer, is operatively connected to each blower 15, each main thruster 22, each side thruster 24, each pivot arm motor 29, each wheel extension/retraction motor 27, and each hydrofoil extension/retraction motor 46. Central processor 34 is connected to these components in the ways commonly known in the art, such that the speed and air output of each blower can be independently controlled; the speed, thrust, and rotation (i.e., the angle or direction of thrust) of each main thruster can be independently controlled; the speed, thrust, and rotation (i.e., the angle or direction of thrust) of each side thruster can be independently controlled; each pivot arm motor and thus each pivot arm assembly can be independently controlled; and each wheel extension/retraction motor can be independently controlled.

It should be understood that although the aforementioned components can be independently controlled, there may be situations wherein it is desirable to run the components at a similar speed, thrust, rotation angle, etc. By way of non-limiting example, there can be situations wherein it is desirable to run a particular blower at a lower speed to generate less air output, and there may be situations wherein it is desirable to run all the blowers at the same speed to generate the same air output and lift. As another non-limiting example, there can be situations wherein it is desirable to run both side thrusters at the same speed to minimize any "torque steer" imparted to the hovercraft, and there may be situations wherein it is desirable to run one side thruster at a different speed (or rotation/thrust angle) than the other side thruster.

Central processor 34 is also operatively connected, in the ways commonly known in the art, to a series of sensors that provide information about the position and change in position, velocity, and acceleration of the hovercraft. Central processor 34 is operatively connected to first accelerometer 35, which measures the change in position of the hovercraft along the "x" axis, which for convention's sake will be considered to be a line running through the center of main body 11 from front to rear. Central processor 34 is also operatively connected to second accelerometer 36, which measures the change in position of the hovercraft along the "y" axis, which for convention's sake will be considered to be a line running through the center of main body 11 from side to side. And central processor 34 is operatively connected to third accelerometer 37, which measures the change in position of the hovercraft along the "z" axis, which for convention's sake will be considered to be a line running through the center of main body 11 from top to bottom. The accelerometers also measure the rate of change in position (velocity) along the respective axes, and the acceleration along the respective axes.

Central processor 34 is also operatively connected to first gyroscope 38, which measures the roll angle of the hovercraft—i.e., its angle of rotation about the roll ("x") axis running from front to rear of the hovercraft; to second gyroscope 39, which measures the pitch angle of the hovercraft—i.e., its angle of rotation up or down about the pitch ("y") axis running from side to side of the hovercraft; and to third gyroscope 40, which measures the yaw angle of the hovercraft—i.e., its angle of rotation left or right about the yaw ("z") axis running from top to bottom of the hovercraft.

Central processor 34 receives the feedback from these accelerometers and gyroscopes, and thus can tell the position of the hovercraft at any given time as well as the change in that position occurring from various forces acting on the hovercraft, including gravity when the hovercraft is traveling up, down, or laterally across an incline. Central processor 34 also accounts for the shifts in the hovercraft's center of gravity that result from the raising and lowering of the lift chambers. Central processor 34 can optionally be operatively connected to a Global Positioning System (GPS), which can detect the position and change in position of the hovercraft, and which can substitute for or supplement the feedback from the gyroscopes and accelerometers.

A control module 42 is connected to central processor 34, and via central processor 34 the hovercraft operator can increase or decrease the speed of blowers 15; increase or decrease the thrust of main thrusters 22 and side thrusters 24 and rotate them to change their thrust angle; operate pivot arm motors 29 to raise or lower pivot arm assemblies 17, 18, and 19; and extend or retract wheel assemblies 26 or hydrofoil assemblies 45; The hovercraft operator can operate these components independently if desired or operate them in conjunction with one another, as discussed above.

Main body 11 also contains a power source 43 which is used to power the various components of the hovercraft. All the power connections are not shown in FIG. 11, but it should be understood that power source 43 is operatively connected to central processor 34 and all other control or sensor components that require power, as well as to the blowers, main and side thrusters, pivot arm motors, wheel extension/retraction motors, and hydrofoil extension/retraction motors.

Software 44 resides on central processor 34. This software is of the kind known in the aircraft control art, particularly the helicopter control art, but has not been previously used to control hovercrafts. For example, circuit boards and software are available from KapteinKUK, also known as KKmulticopter; and also from MultiWii, an open source software project. Absent any input from the operator, the software will use the inputs from accelerometers 35-37 and gyroscopes 38-40 (and optionally from GPS 41) and automatically operate main thrusters 22 and side thrusters 24 to counteract any forces acting on the hovercraft from gravity or any other source, and keep the hovercraft in a steady position even if it is, for example, on an uphill or downhill slope. When the hovercraft operator signals via control module 42 that forward, backward, and/or side thrust is desired to move or steer the hovercraft in a certain direction, software 44 will execute those operator commands, while also taking into account any forces acting on the hovercraft from sources other than the operator. Thus the hovercraft moves in the direction desired by the operator in a smooth, accurate, and stable manner.

A notable achievement of the invention is that when the hovercraft is proceeding down a road, hovering above the road, and the road then turns or curves, the inventive hovercraft avoids the "slip" that conventional hovercrafts experience when the operator wishes to change the yaw angle—i.e., steer—to follow the turning or curving road. This slip is due to the forward momentum of the hovercraft in the original direction, which serves to impede a smooth and accurate change in that original direction. Specifically, the hovercraft's forward momentum causes it to understeer, and swing wide of (go past) the turn or curve in the road. The inventive hovercraft avoids this problem, because its accelerometers and gyroscopes detect the slip and the central processor automatically adjusts for it—for example, by applying more power to the main/forward thruster that is on the outside of the curve, and/or by pointing the side thrusters toward the outside of the curve, to counteract the hovercraft's forward momentum. This improved control applies of course not just when the hovercraft is traveling over a road, but also when the hovercraft is traveling over any surface and the operator wishes to change direction in a smooth, accurate, and stable manner.

FIGS. 12-16 illustrate how the hovercraft surmounts an obstacle that is encountered. The hovercraft's direction of travel is indicated by the arrow in these figures. The mechanisms that raise and lower the pivot arm assemblies are not shown in these figures; however, it is apparent from FIG. 10 and the foregoing description how the pivot arm assemblies are raised and lowered. Also, for ease of illustration, the full length of obstacle 32 is not shown in FIGS. 12-14, but will be apparent from FIGS. 15 and 16.

Figure 12:
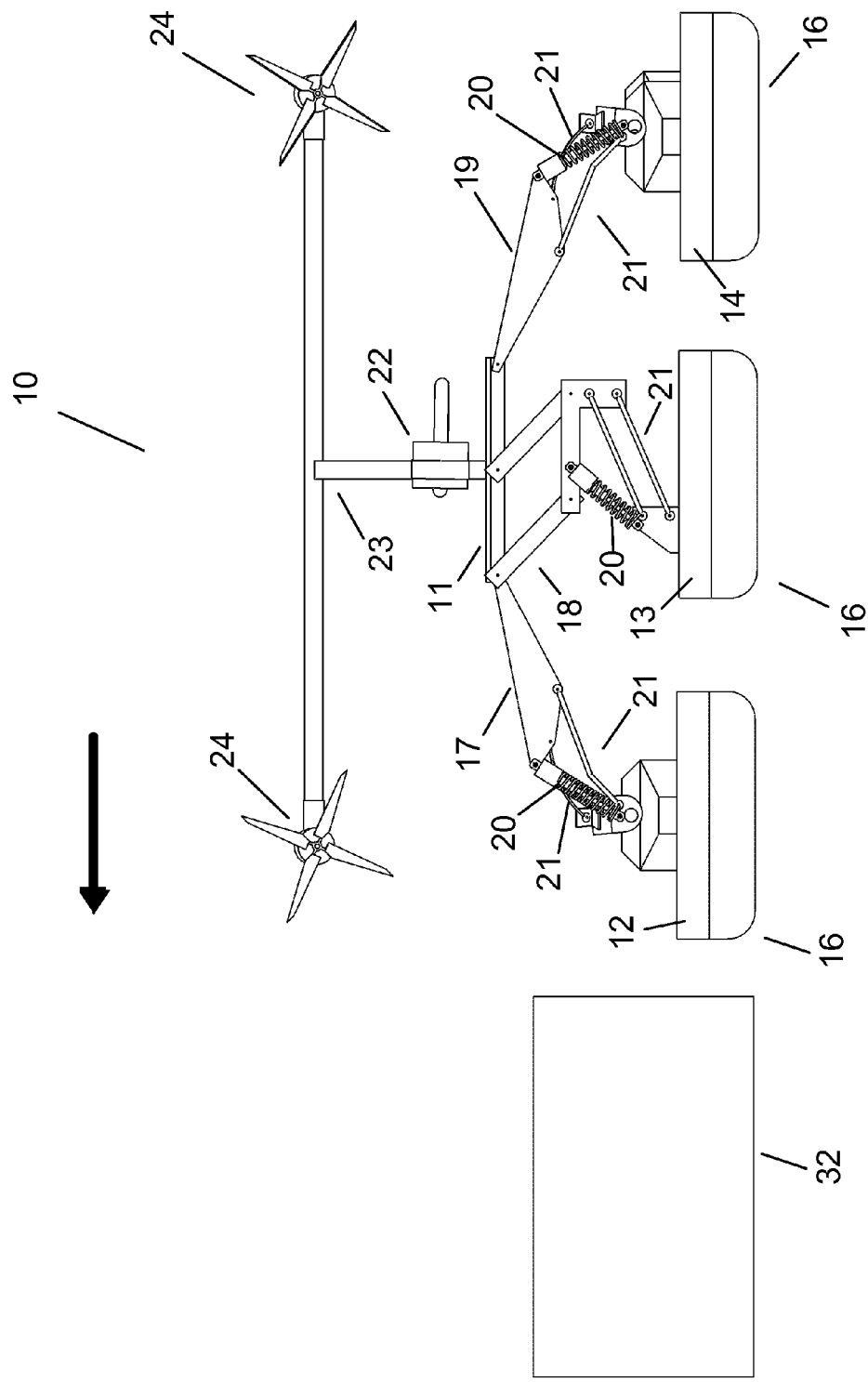
FIG. 12 shows the hovercraft approaching an obstacle that must be surmounted.
Figure 13:
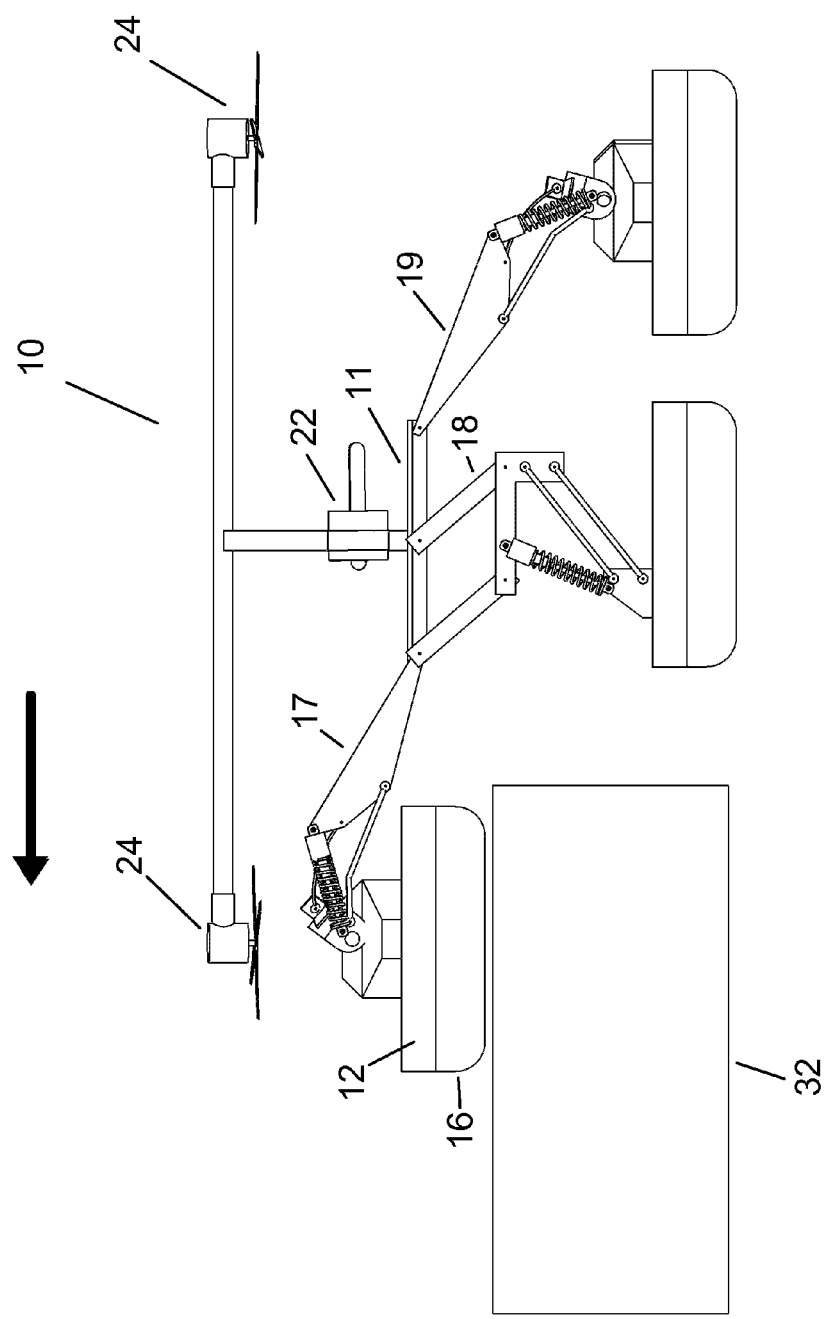
FIG. 13 shows the hovercraft with the first lift chamber having surmounted the obstacle.

Specifically, FIG. 12 shows hovercraft 10 approaching obstacle 32. First pivot arm assembly 17, second pivot arm assembly 18, and third pivot arm assembly 19—and accordingly, first lift chamber 12, second lift chamber 13, and third lift chamber 14—are all in the lowered/down position typically used when hovercraft 10 is traveling across a relatively smooth, obstacle-free surface. Optionally, side thrusters 24 are rotated to point downward, thus supplying extra lift (upward thrust) to the hovercraft. As hovercraft 10 approaches obstacle 32, first pivot arm assembly 17 is raised until the bottom of flexible skirt 16 on first lift chamber 12 clears the front edge of obstacle 32. Hovercraft 10 is then moved forward until the position shown in FIG. 13 is achieved—i.e., first lift chamber 12 having surmounted obstacle 32. It can be appreciated that the hovercraft's center of gravity shifts as the lift chambers are raised and lowered, and at this point, the hovercraft's center of gravity is behind second lift chamber 13.

Figure 14:
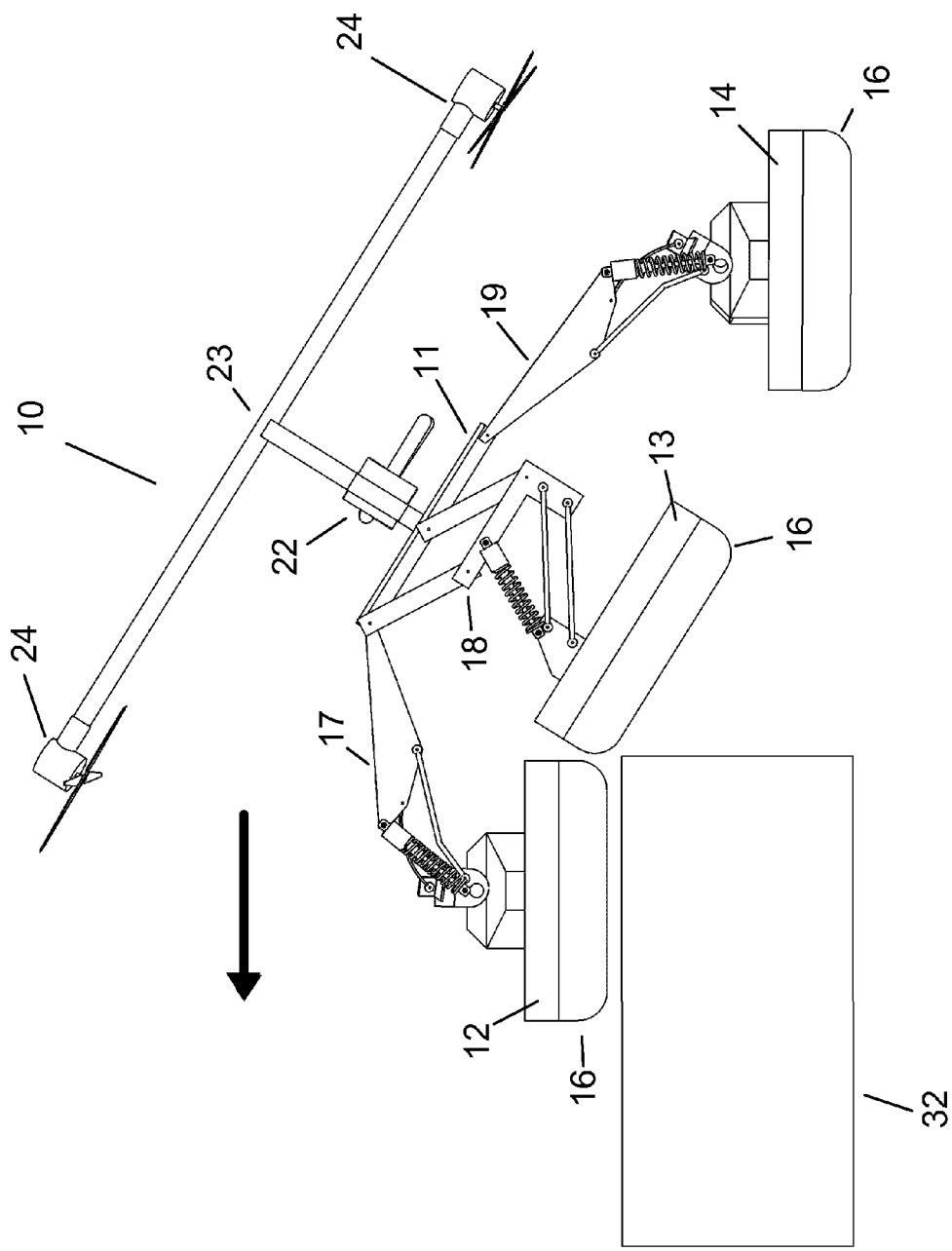
FIG. 14 shows the hovercraft with the second lift chamber in the process of surmounting the obstacle.
Figure 15:
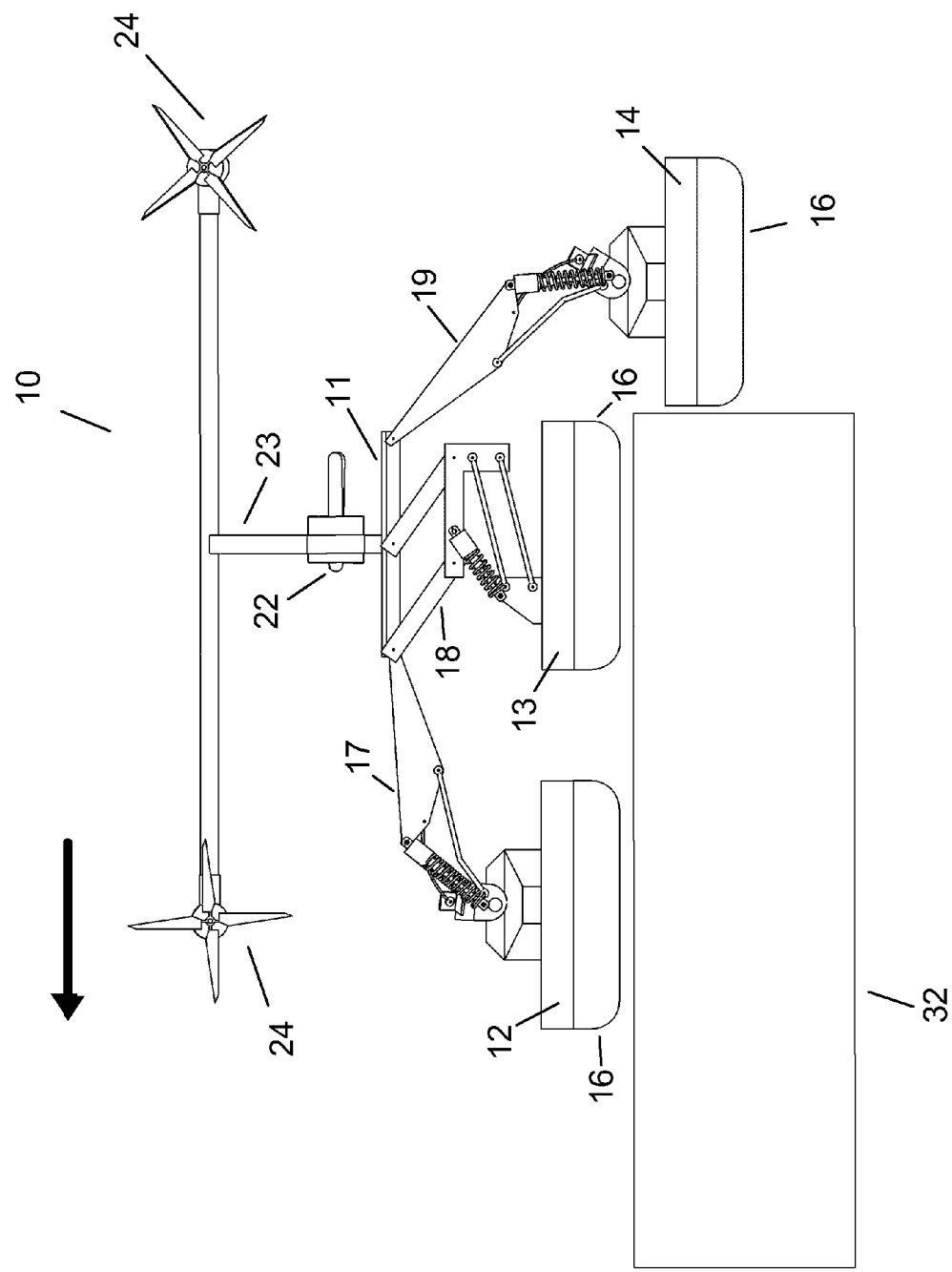
FIG. 15 shows the hovercraft with the first and second lift chambers having surmounted the obstacle.

As hovercraft 10 continues further toward obstacle 32, second pivot arm assembly 18 begins to be raised, as shown in FIG. 14. When the bottom of flexible skirt 16 on second lift chamber 13 clears the front edge of obstacle 32, hovercraft 10 is then moved forward until the position shown in FIG. 15 is achieved—i.e., first lift chamber 12 and second lift chamber 13 both having surmounted obstacle 32. At this point, the hovercraft's center of gravity has shifted forward, and is now on first lift chamber 12 and second lift chamber 13.

Figure 16:
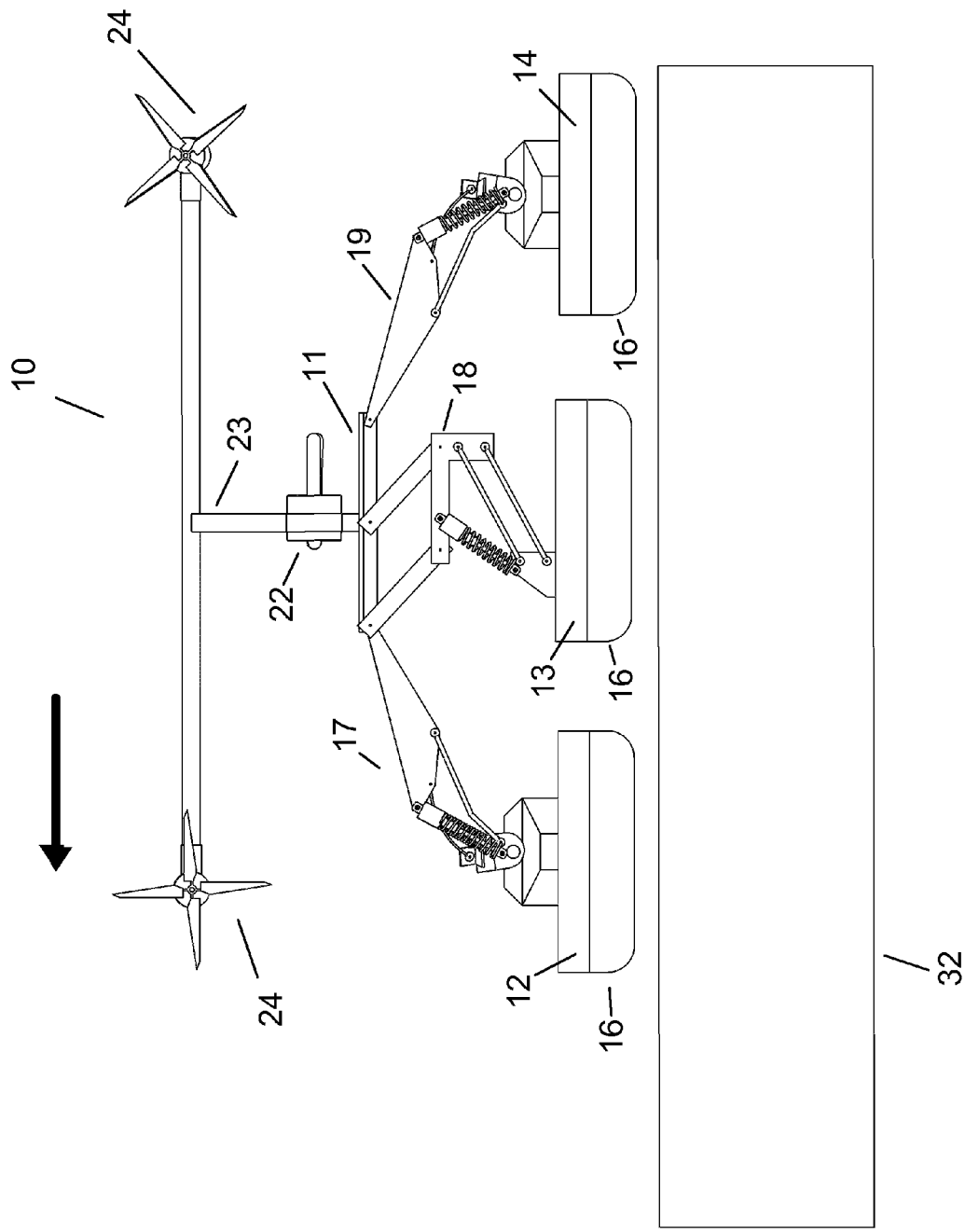
FIG. 16 shows the hovercraft with the first, second, and third lift chambers having surmounted the obstacle.

As hovercraft 10 continues further toward obstacle 32, third pivot arm assembly 19 is similarly raised until the bottom of flexible skirt 16 on third lift chamber 14 clears the front edge of obstacle 32. Hovercraft 10 is then moved forward until the position shown in FIG. 16 is achieved—i.e., first lift chamber 12, second lift chamber 13, and third lift chamber 14 all having surmounted obstacle 32. Side thrusters 24 are rotated back to a side-pointing position in FIGS. 14 and 15. FIG. 16 shows first pivot arm assembly 17, second pivot arm assembly 18, and third pivot arm assembly 19 in the raised/up position; however, it can be appreciated that once all the lift chambers have surmounted the obstacle, the pivot arm assemblies can be lowered which would effectively raise the height of main body 11 from the ground or other operating surface.

If the obstacle continues, such as in a situation where there is a permanent change in ground elevation, then hovercraft 10 can continue moving forward with the pivot arm assemblies in the raised/up position, or the pivot arm assemblies can be lowered before proceeding. If the obstacle is a wall, short ridge, or other impediment that does not continue, then for hovercraft 10 to climb down from the obstacle, the steps are basically reversed. That is, hovercraft 10 is progressively moved forward while first pivot arm assembly 17, second pivot arm assembly 18, and third pivot arm assembly 19 are each lowered in turn, until hovercraft 10 is resting on the surface past obstacle 32.

Figure 17:
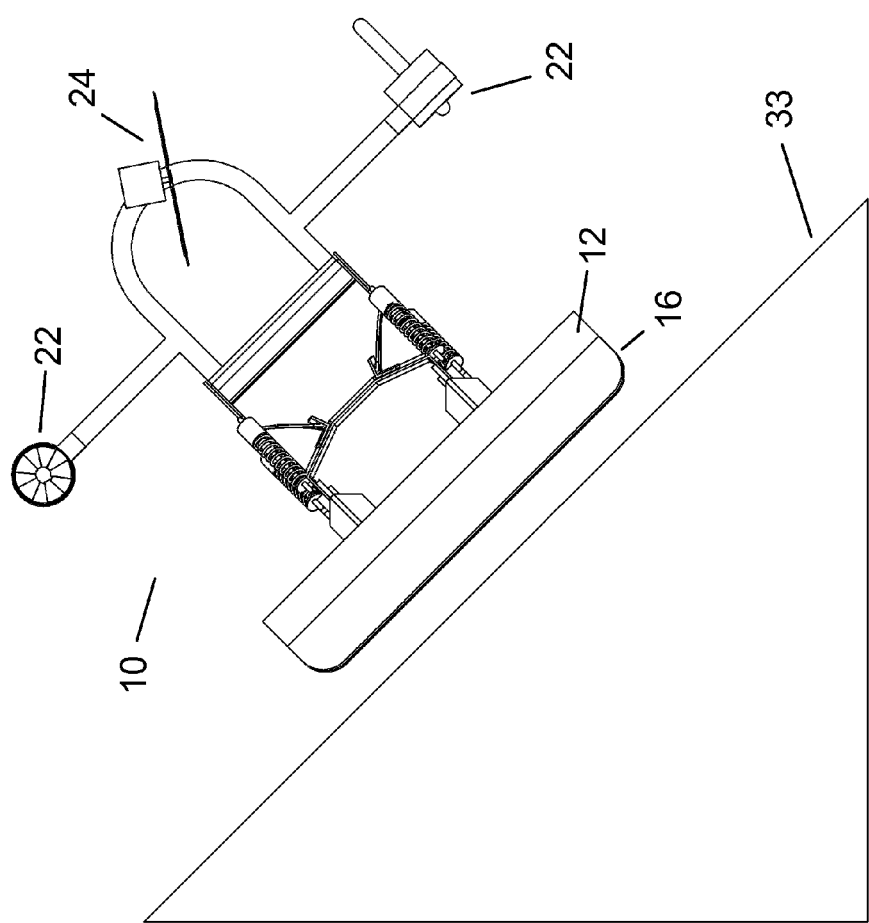
FIG. 17 is a front view of the hovercraft traveling laterally across an inclined surface.

FIG. 17 is a front view of the hovercraft traveling laterally across an incline 33. That is, hovercraft 10 is coming towards the viewer in this figure. Side thruster 24 is pointed to the downside of hovercraft 10—that is, down the incline—in order to provide countering thrust to offset the natural force of gravity which would otherwise cause hovercraft 10 to slide down incline 33 as hovercraft 10 travels laterally across incline 33. Said another way, the counterthrust from side thruster 24 allows hovercraft 10 to maintain its vertical position on incline 33 as it travels laterally across incline 33. It should be noted that side thruster 24 can be rotated to a different degree than that shown in this view—for example, to point more directly or less directly at the lower portion of incline 33 or level ground which may be at the bottom of incline 33.

Although only the side thruster 24 at the fore of hovercraft 10 can be seen in this view, it should be understood that the side thruster 24 at the rear of hovercraft 24 can also provide counterthrust against the force of gravity. In sum, one or both side thrusters can be employed, at varying degrees of power/thrust, depending on the severity of incline 33. If only one side thruster 24 is employed, or if both side thrusters 24 are employed but at different thrust levels, that will rotate hovercraft 10 somewhat about its center, which will impart a steering effect as hovercraft 10 moves laterally across incline 33.

Also, in this view one of the main thrusters 22 is rotated to point downward toward the surface of incline 33, which has the effect of pulling that side of hovercraft 10 toward the surface of incline 33 thus helping to prevent blower air from escaping under flexible skirt 16.

Figure 18:
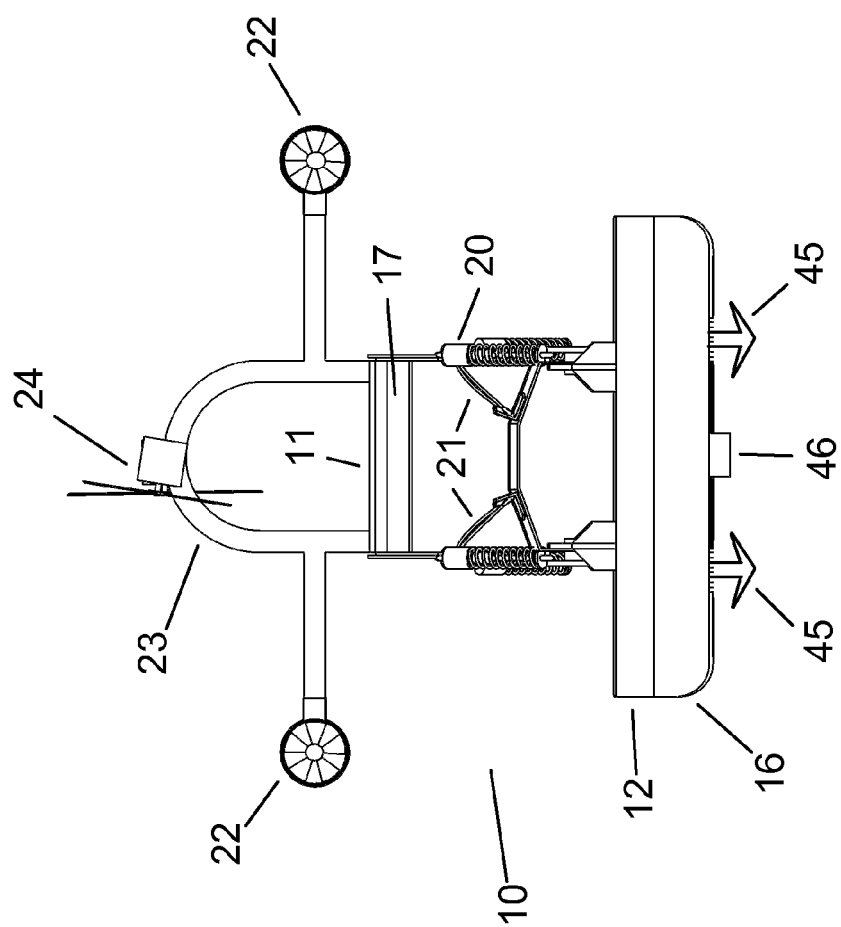
FIG. 18 is a front view of a hovercraft embodiment with extendable/retractable hydrofoils.

FIG. 18 is a front view of a hovercraft embodiment with extendable/retractable hydrofoil assemblies 45 located at the bottom of first lift chamber 12 and third lift chamber 14, in the interior thereof. Via hydrofoil extension/retraction motors 46 or hydraulic, manual, or other suitable means, hydrofoil assemblies 45 can be lowered to a water surface when such surface is suitably smooth, to enable the hovercraft to ride on the hydrofoils instead of a cushion of air. Hydrofoil assemblies 45 are retracted when not in use, also via hydrofoil extension/retraction motors 46 or hydraulic, manual, or other suitable means. The hydrofoils in hydrofoil assemblies 45 are steerable, to enable the hovercraft to change direction when riding on hydrofoils instead of air. The hovercraft may also of course be "steered" in hydrofoils-extended mode by varying the thrust of one main thruster 22 versus the other main thruster 22.

While the above descriptions contain many specificities, these shall not be construed as limitations on the scope of the invention, but rather as exemplifications of embodiments thereof. Many other variations are possible without departing from the spirit of the invention. Examples of just a few of the possible variations follow:

The raising and lowering of the lift chambers can be initiated and controlled by the hovercraft operator, or can be automatically initiated and controlled by the central processor via sensors connected thereto that detect when the hovercraft is approaching an obstacle, detect the height and breadth of the obstacle. The central processor can then determine and execute the appropriate lift chambers movements based on the sensor information.

The hovercraft can optionally include devices to provide driving power to the wheel assemblies, to substitute for or supplement the driving thrust provided by the main thrusters.

The power source can employ any suitable power technology—by way of non-limiting example, battery, solar, other electric, internal combustion or other fossil fuel, steam, nuclear, etc. can be used.

It should be understood that relays and other electrical circuitry are included as necessary for the power and control connections between components, as known in the prior art.

The size and scale of the hovercraft can be different than that shown—i.e., it can be large enough to carry a person or multiple persons, as well as cargo.

The power and control connections between components can be wired or wireless, using any suitable known technology.

It should understood that the position of each pivot arm assembly and its associated lift chamber relative to the hovercraft main body can change as the hovercraft proceeds to surmount an obstacle—and to accomplish this, the pivot arm assemblies are raised or lowered accordingly, using the raising/lowering mechanisms shown in FIG. 10 and described above. Said another way, while for clarity the raising/lowering mechanisms are not shown in FIGS. 12-16, it should be understood that the raising/lowering mechanisms are effecting the position changes of the pivot arm assemblies in those figures.

The hovercraft can have more or fewer lift chambers, as long as there are sufficient independently-operable lift chambers to allow the hovercraft to surmount an obstacle.

The hovercraft can contain both wheel assemblies and hydrofoil assemblies, instead of one or the other as shown in the figures. In the case of wheel assemblies and hydrofoil assemblies both being present, they can be extended and retracted independently depending on the desired running condition.

The main and side thrusters can be mounted in different locations than those shown—by way of non-limiting example, they can be mounted on an extension to the main body instead of on the main body or a frame connected thereto.

The pivot arm assemblies can have different configurations and constructions than those shown in the figures. In addition, the action of the second (center) pivot arm can be "tied" to the action of the first (front) pivot arm assembly and/or the third (rear) pivot arm assembly via additional brackets, such that moving the first and/or third pivot arm (and their respective lift chambers) in one direction causes the second pivot arm assembly (and its lift chamber) to move in the opposite direction. In other words, raising the first and/or third pivot arm causes the second pivot arm assembly to lower, and vice-versa.

The hydrofoils can be differently-shaped and differently-sized than those shown in FIG. 18. As a non-limiting example, the hydrofoils can be the fully-submerged type rather than the surface-piercing type that is shown.

The flexible skirts can be retracted when the wheels or hydrofoils are deployed, to ensure that they would not scrape against the running surface.

Different means to raise and lower the pivot arm assemblies and thus the lift chambers can be used—as non-limiting examples, hydraulic or pneumatic/compressed air means can be used instead of the electric motor-driven mechanisms shown in FIG. 10. The pivot arm assemblies and lift chambers can even be manually lifted by the operator or an assistant.

While the central processor and the software residing thereon allows for automatic control of the functions discussed above, it should be understood that the functions done by the control processor and software can also be done manually—i.e., by human control.

Accordingly, the scope of the invention should be determined not by the embodiments illustrated, but by the appended claims and their legal equivalents.

What is claimed is:

1. A hovercraft, comprising:
   (a) a main body;
   (b) a plurality of lift chambers attached to the main body, with at least two of the lift chambers being operable independently of each other;
   (c) means for providing lift to the lift chambers;
   (d) means for providing forward motion to the hovercraft; and
   (e) arms that connect the at least two lift chambers to the main body, the arms being adapted to raise or lower the at least two lift chambers with respect to the main body, and the arms being separate and distinct from the at least two lift chambers;
   wherein the hovercraft can traverse uneven surfaces and surmount obstacles.

2. The hovercraft of claim 1, wherein at least two of the lift chambers are movable with respect to the main body, independently of each other, and wherein a plane formed by the bottom of one lift chamber can have a different angle, with respect to the main body, than a plane formed by the bottom of another lift chamber.

3. The hovercraft of claim 1, wherein all the lift chambers are movable with respect to the main body, independently of each other, so that a plane formed by the bottom of one lift chamber can have a different angle with respect to the main body than a plane formed by the bottom of another lift chamber.

4. The hovercraft of claim 3, wherein arms connect all the lift chambers to the main body, and the arms raise or lower the lift chambers with respect to the main body, and the arms are separate and distinct from the lift chambers.

5. The hovercraft of claim 1, wherein a first lift pressure supplied to at least one of the lift chambers is different than a second lift pressure supplied to another of the lift chambers.

6. The hovercraft of claim 1, wherein the means for providing lift is a blower.

7. The hovercraft of claim 1, wherein the means for providing forward motion is at least one thruster.

8. The hovercraft of claim 7, wherein the at least one thruster is rotatable to provide backward motion to the hovercraft.

9. The hovercraft of claim 1, wherein the hovercraft also comprises at least one side thruster to impart side force to the hovercraft.

10. The hovercraft of claim 9, wherein the at least one side thruster is rotatable, to offset other forces acting on the hovercraft or provide additional lift to the hovercraft.

11. The hovercraft of claim 1, wherein the hovercraft also comprises at least one wheel that is extended to enable wheeled operation of the hovercraft and retracted when wheeled operation is not desired.

12. The hovercraft of claim 1, wherein the hovercraft also comprises at least one hydrofoil that is extended to enable hydrofoil operation of the hovercraft and retracted when hydrofoil operation is not desired.

13. The hovercraft of claim 1, wherein the hovercraft also comprises at least one accelerometer for controlling a motion of the hovercraft.

14. The hovercraft of claim 1, wherein the hovercraft also comprises at least one gyroscope for controlling a motion of the hovercraft.

15. The hovercraft of claim 1, wherein the hovercraft also comprises a global positioning system for controlling a motion of the hovercraft.

16. A method of surmounting an obstacle with a hovercraft, comprising the steps of:

provididng a hovercraft with a main body; a plurality of lift chambers attached to the main body with at least two of the lift chambers being operable independently of each other; arms that connect at least two of the lift chambers to the main body, the arms being adapted to raise or lower the at least two lift chambers with respect to the main body, and the arms being separate and distinct from the at least two lift chambers; means for providing lift to the lift chambers; and means for providing forward motion to the hovercraft;

approaching the obstacle, raising a first lift chamber until the first lift chamber clears the obstacle, then moving the hovercraft forward toward the obstacle until the first lift chamber has surmounted the obstacle;

raising a second lift chamber until the second lift chamber clears the obstacle, then moving the hovercraft forward toward the obstacle until the second lift chamber has surmounted the obstacle.

17. The method of claim 16, wherein the method also comprises the step of raising a third lift chamber until the third lift chamber clears the obstacle, then moving the hovercraft forward toward the obstacle until the third lift chamber has surmounted the obstacle.

18. The method of claim 16, wherein the method also comprises using thrusters to provide additional lift to the hovercraft.

19. The method of claim 16, wherein the means for providing forward motion is at least one thruster.

* * * * *